Feb. 26, 1957  A. W. DANIEL  2,782,517
MICROMETER DEPTH GAGE
Filed Oct. 13, 1952

INVENTOR
ARTHUR W. DANIEL
by Toulmin & Toulmin
ATTORNEYS

United States Patent Office 2,782,517
Patented Feb. 26, 1957

2,782,517

MICROMETER DEPTH GAGE

Arthur W. Daniel, Donnelsville, Ohio

Application October 13, 1952, Serial No. 314,467

3 Claims. (Cl. 33—170)

This invention relates to micrometer depth gages.

Micrometer depth gages as presently constructed and marketed have a notable peculiarity not present in other common pieces of micrometer equipment. For example, the graduations on the standard micrometer caliper start at 0 when the thimble and spindle are screwed in to the fullest extent (jaws closed) and as the micrometer is opened, that is, as the thimble is backed away, the readings are exposed—that is the figures which indicate the measurement are always visible. In contrast thereto the readings on the barrel of the depth gage micrometers of commerce are reversed—thus when the thimble is screwed down in the making of a measurement the graduations which indicate the measurement are concealed. Accordingly when the micrometer reading is say .990 the first 9 of this figure will not be visible to the reader at all and it will be necessary for him to perform a mental subtraction from the only visible number shown that is 1.000, in order to arrive at the first 9 of the above reading.

The above noted arrangement is derived from the fact that as in most other micrometers the spindle or stem traverse of the depth gage micrometer is directly related to the thimble traverse; since the stem or spindle traverse from zero reading is the opposite directionally, in a depth gage micrometer of that in other micrometers the thimble traverse is also opposite and accordingly the thimble tends to cover and hide from view the most important numeral on the fixed scale necessitating the mental calculation noted hereinbefore when taking a reading.

Since the depth gage micrometer and the other micrometers will be used repeatedly and alternately by a workman in the production of even a single workpiece the opportunity for error is greatly enhanced by the fact that the important figure of the depth gage micrometer is not visible; a common error is to read the first visible figure adjacent the scale of the thimble. This tendency to error exists to such an extent that it is common practice in text books on gages and instruments, and in instruction books, to refer particularly to the abnormal arrangement of the fixed scale of the depth gage micrometer.

This present invention has for its primary objective the provision of a micrometer depth gage which overcomes the above noted defect and permits the fixed scale graduations to be visible during the taking of the micrometer reading.

The preferred embodiment of the invention is set forth by way of illustration and not limitation in the following detailed description and accompanying drawing wherein.

Figure 1:
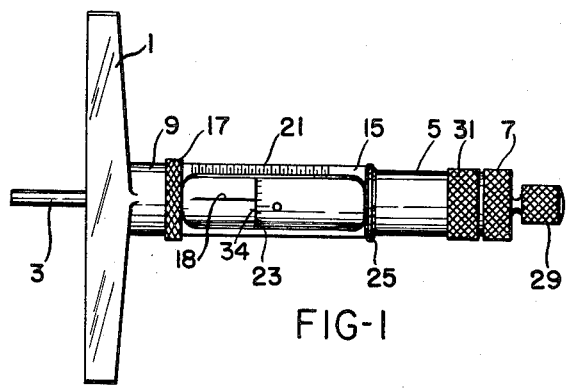
Figure 1 is a plan view of the micrometer depth gage of invention.

Referring to the drawings there is indicated in Figure 1 a depth gage micrometer comprising at 1 a base having an aperture 2 (Figure 3) through which there extends (Figures 1 and 2) a measuring rod or spindle 3.

Spindle or stem 3 passes through the central axis of a thimble 5; a hollow shoulder 9 of base 1 is provided with an outer threaded portion 11 from which there extends an internally threaded shank 13. Barrel 15 in the assembled condition of the instrument (Figure 1) extends over the shank 13, and end 17 of barrel 15 which is internally threaded engages with the threads at 11 to securely fix the barrel to the structure. Accordingly spindle 3 (Figure 3) may readily be passed through shank 13, shoulder 9 and aperture 2 when the thimble 5 is assembled and actuated as described more particularly hereinafter.

Barrel 15 is provided with a cut-out portion 19 which is bordered as shown by a fixed scale or indicia 21, which indicia are adapted to cooperate with the indicia 23 extending around the circumference or periphery of thimble 5 at the edge thereof to thereby indicate the traverse of spindle 3 and micrometer screw 27; the indicia 23 form the movable scale of the micrometer. Screw 27 (Figure 3) is fixedly secured to thimble 5 by externally knurled nut 7; and spindle 3 is maintained fixed with respect to screw 27 by knurled nut 29 which engages a threaded portion of the screw 27 over an enlarged portion (not shown) of spindle 3. Accordingly thimble 5, spindle 3 and micrometer screw 27 advance as a unit in the operation of the instrument.

Figure 3:
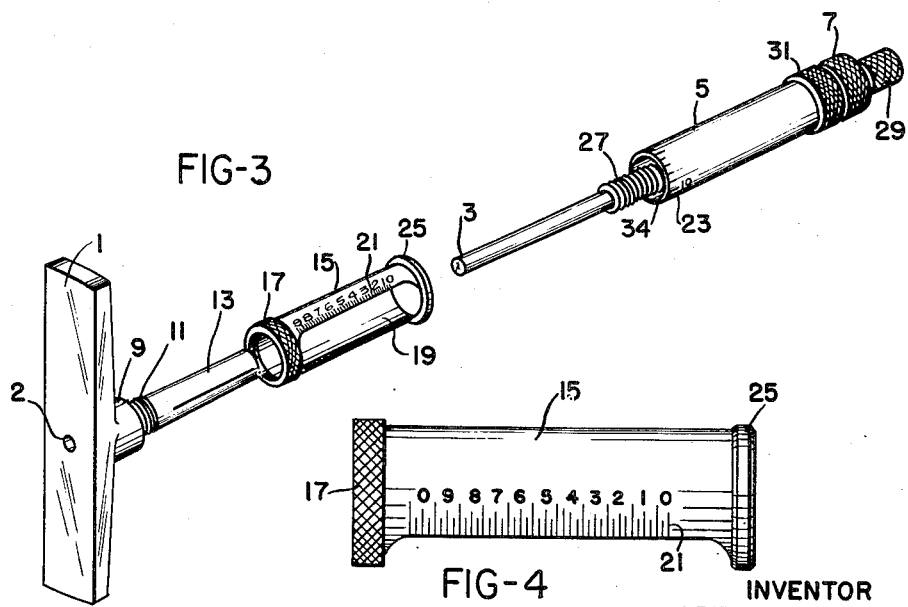
Figure 3 is an exploded view of the micrometer depth gage of Figure 1 illustrating the principal parts of the gage.

Cut-out portion 19 may extend around the circumference of the barrel 15 to a considerable degree as indicated in Figures 1 and 3 or may be a slit bordering fixed scale 21 and having a width sufficient to permit of lining up the indicia 23 of thimble 5 with an indexing line 18 on the shank 13. Indexing line 18 extends across the visible portion of shank 13 and is substantially co-extensive with the lower edge of scale 21. The only requirement in this connection is that the slit or cut-out portion be of sufficient width to permit ready visual inspection of the indexing line 18 and the indicia 23 on the thimble 5.

Micrometer screw 27 may be cut in the usual manner to have 40 threads to the inch; micrometer thimble 5 is then provided, as is also customary, with 25 graduations about its periphery as at 23, and a full turn of the thimble indicates a traverse of the thimble of .025 inch. The zero of the thimble need not however lie along the line of indicia 21 of barrel 15 but may be displaced therefrom it being only necessary that the micrometer screw be provided to cause the zero of the thimble to zero with the scribed indexing line 18 or its equivalent when the stem or spindle 3 is flush with the face of base 1 at aperture 2. Thus in the operation of the micrometer the movable scale is indexed in coordination with the fixed scale.

To assemble the micrometer for operation outer graduated barrel 15 is threaded to portion 11; thimble 5 with micrometer screw 27 and spindle 3 mounted as shown in Figure 3 are then passed through end 25 of barrel 15 and screw 27 is engaged with the internal threads of shank 13 while spindle 3 passes centrally therethrough and through shoulder 9 also.

Figure 2:
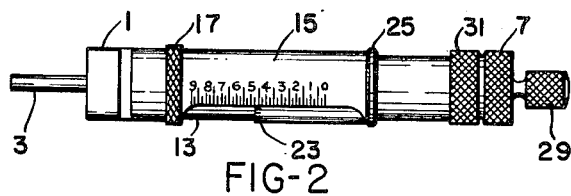
Figure 2 is a front elevational view of the structure of Figure 1.
Figure 4:
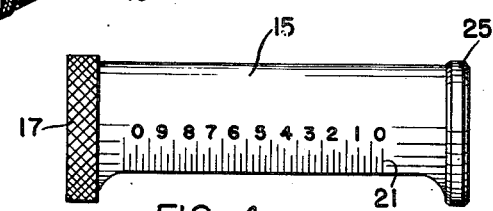
Figure 4 is an elevational view of a primary element of the invention.

With the assembled unit zeroed the left hand edge 34 of thimble 5 will lie on the zero at the right hand end of scale 21 and the zero of scale 23 will be opposite visible index line 18. Revolving the thimble 5 will then cause screw 27 to enter further into shank 13 carrying spindle 3 along therewith, and when the traverse of the spindle and thimble has been halted by an object, the depth of which is to be measured, the micrometer may be read directly, the pertinent numerals being clearly visible. Thus as indicated in Figure 2 of the drawing the first pertinent numeral of the reading would be the figure 4. With standard depth gage micrometers wherein the thimble is on the outside of the barrel this pertinent figure 4 would be hidden from view by the thimble. The additional increments of the reading (Figure 2) are then made in the standard manner utilizing the left hand edge 34 of thimble 5 and the scale 23 together with indexing line 18. It is to be noted that in the structure described the numerical value of the indicia on the scale 21 increases toward the base 1 and that the indicia extend over a major portion of the barrel length.

The primary objective of the invention, to render all of the pertinent numerals visible, has thus been achieved. It is to be noted that this objective is attained with a structure which is substantially dust and grit proof since none of these contaminants could in the course of normal usage enter the micrometer threads. Also any dust which may enter the barrel 15 may be readily blown therefrom.

While the preferred embodiment of the invention has been described in detail it is to be understood that the invention is not to be considered as limited thereto for other forms may be employed to accomplish the primary objective of the invention. Thus for example the movable thimble may be externally threaded over a portion of its circumference to cooperate with internal threads of an outer barrel; also the thimble itself may be internally threaded to cooperate with an externally threaded shank, the thimble being slidably engageable with the outer barrel.

It is clear therefore that the invention is susceptible to modification in order to adapt it to different usages and conditions and accordingly, it is desired to comprehend such modifications within this invention as may fall within the scope of the appended claims.

I claim:

1. In combination, in a depth gauge micrometer, a base, a measuring spindle which is moved outwardly of the base to effect depth measurements, a thimble carried on an end of the spindle, said thimble having indicia around a periphery thereof, a stationary outer barrel fast to a base portion supported around the measuring spindle in spaced relation therewith and through which barrel said thimble moves toward the base to effect a depth measurement, said barrel having indicia extending in the direction of barrel length and which indicia cooperate with the indicia of said thimble to indicate the traverse of the thimble through the barrel and the movement of the spindle from the base, said barrel having a cut-out portion bordering the indicia thereof to expose the indicia of the thimble to view in the cooperative relation, the indicia on the barrel length being so arranged that the numerical values thereof increase toward the base, and the depth gage micrometer having means extending parallel with the fixed scale substantially coextensive with the fixed scale and cooperable with the movable scale for indexing the movable scale in coordination with the fixed scale.

2. In combination, in a depth gauge micrometer, a base, a shank extending from the base and provided with an index marking, a measuring spindle which is moved through the shank outwardly of the base to effect a depth measurement, a thimble affixed to the spindle for effecting spindle movement through the shank and base, said thimble having peripheral indicia thereon, an outer stationary barrel secured in spaced relation with the said shank and within which barrel said thimble is movable toward the base to effect a depth measurement, which barrel has indicia thereon extending in the direction of the barrel length and which indicia are cooperable with the indicia of said thimble and the index mark of said shank to indicate the traverse of the thimble through the barrel and the spindle through the base, said barrel having a cutout portion bordering the indicia thereof to expose the indicia of the thimble and the index marking of said shank to view in the said cooperative relation, the indicia on the barrel length being so arranged that the numerical value thereof increases toward the base.

3. In a depth gauge micrometer in which a measuring spindle moves outwardly through a base to effect depth measurements and the extension of which spindle from said base is normally indicated by cooperating fixed and movable scales, and which micrometer has indexing means extending parallel with the fixed scale substantially co-extensive therewith and traversable by the movable scale for indexing the movable scale in coordination with the fixed scale, the improvement which comprises the combination with said base of a stationary outer barrel which extends from the base and surrounds a portion of the spindle and is adapted to surround the movable scale in movement of the spindle and which barrel has extending rectilineally along the longitudinal surface thereof the fixed scale of the micrometer, the numerals of which scale increase in value in the direction of the base, the barrel having a cut-out portion bordering and coextensive with the fixed scale for viewing of the movable scale in the cooperative relation of the scales.

References Cited in the file of this patent

UNITED STATES PATENTS

| | | |
|---|---|---|
| 359,295 | Tickell | Mar. 15, 1887 |
| 1,235,785 | Fishel | Aug. 7, 1917 |
| 1,317,747 | Whatley | Oct. 7, 1919 |
| 1,388,740 | Miller | Aug. 23, 1921 |
| 1,737,764 | Jacobs | Dec. 3, 1929 |
| 2,400,371 | Reeser | May 14, 1946 |
| 2,689,408 | Cornell et al. | Sept. 21, 1954 |

FOREIGN PATENTS

| | | |
|---|---|---|
| 183,062 | Great Britain | July 20, 1922 |